US008090312B2

(12) United States Patent
Robinson

(10) Patent No.: US 8,090,312 B2
(45) Date of Patent: Jan. 3, 2012

(54) SYSTEM AND METHOD FOR OBSERVING A SATELLITE USING A SATELLITE IN RETROGRADE ORBIT

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 714 days.

(21) Appl. No.: 11/542,494

(22) Filed: Oct. 3, 2006

(65) Prior Publication Data
US 2008/0081556 A1    Apr. 3, 2008

(51) Int. Cl.
*H04B 7/185*    (2006.01)
(52) U.S. Cl. ........ 455/12.1; 342/352; 343/754; 370/316
(58) Field of Classification Search ................. 455/12.1
See application file for complete search history.

(56) References Cited

U.S. PATENT DOCUMENTS

| | | | | |
|---|---|---|---|---|
| 3,540,048 A | * | 11/1970 | Clemens, Jr. et al. | 342/352 |
| 3,706,141 A | * | 12/1972 | McGraw | 434/140 |
| 4,298,877 A | * | 11/1981 | Sletten | 343/781 CA |
| 4,359,733 A | * | 11/1982 | O'Neill | 342/36 |
| 4,387,391 A | | 6/1983 | Hecker | |
| 4,580,747 A | * | 4/1986 | Pearson | 244/164 |
| 4,775,120 A | * | 10/1988 | Marwick | 244/171.6 |
| 4,985,706 A | * | 1/1991 | Schukat | 342/352 |
| 5,075,682 A | * | 12/1991 | Dehnert | 342/352 |
| 5,446,465 A | * | 8/1995 | Diefes et al. | 342/357.34 |
| 5,582,367 A | * | 12/1996 | Castiel et al. | 244/158.4 |
| 5,641,134 A | * | 6/1997 | Vatt | 455/12.1 |
| 5,669,585 A | * | 9/1997 | Castiel et al. | 244/158.4 |
| 5,685,505 A | * | 11/1997 | Meckler | 244/169 |
| 5,687,084 A | | 11/1997 | Wertz | |
| 5,717,404 A | * | 2/1998 | Malla | 342/357.31 |
| 5,722,042 A | * | 2/1998 | Kimura et al. | 455/13.1 |
| 5,788,187 A | * | 8/1998 | Castiel et al. | 455/12.1 |
| 5,845,206 A | * | 12/1998 | Castiel et al. | 455/13.4 |
| 5,906,337 A | * | 5/1999 | Williams et al. | 244/158.4 |
| 5,957,409 A | * | 9/1999 | Castiel et al. | 244/158.4 |
| 5,971,324 A | * | 10/1999 | Williams et al. | 244/158.4 |
| 6,014,372 A | * | 1/2000 | Kent et al. | 370/316 |
| 6,102,335 A | * | 8/2000 | Castiel et al. | 244/158.4 |
| 6,122,499 A | * | 9/2000 | Magnusson | 455/405 |
| 6,128,575 A | | 10/2000 | Croom et al. | |
| 6,182,927 B1 | * | 2/2001 | Galvin | 244/158.4 |
| 6,182,928 B1 | | 2/2001 | Wagner | |
| 6,263,188 B1 | * | 7/2001 | Castiel et al. | 455/13.1 |
| 6,327,523 B2 | * | 12/2001 | Cellier | 701/13 |
| 6,364,252 B1 | * | 4/2002 | Anderman | 244/158.6 |

(Continued)

*Primary Examiner* — Yuwen Pan
*Assistant Examiner* — Hai V Nguyen
(74) *Attorney, Agent, or Firm* — Christie, Parker & Hale, LLP

(57) ABSTRACT

A satellite and an arrangement for placing the satellite in a retrograde orbit, i.e. inclined at approximately 180° to the equator. Multiple satellites may be used and the orbits thereof may be circular or elliptical. The invention is well-suited for an illustrative satellite inspection application. In this embodiment, the system includes one or more satellites; means disposed on each satellite for receiving electromagnetic energy from objects (e.g. satellites) within a field-of-view thereof; and an arrangement for placing the inspection satellites in a retrograde orbit. The satellites may be equally spaced in a single orbit or disposed in equally spaced orbits. The satellites may include a variety of instruments including radar, infrared, visible, etc. In a radar implementation, the satellite may include a bistatic or (with a transmitter) monostatic radar system. In the bistatic case, the signal may be transmitted from a ground-based or space based platform.

35 Claims, 4 Drawing Sheets

U.S. PATENT DOCUMENTS

| | | | |
|---|---|---|---|
| 6,389,336 B2 * | 5/2002 | Cellier | 701/13 |
| 6,464,174 B1 * | 10/2002 | Turner | 244/158.6 |
| 6,476,764 B2 * | 11/2002 | Fang | 342/359 |
| 6,502,790 B1 * | 1/2003 | Murphy | 244/158.4 |
| 6,553,286 B2 * | 4/2003 | Turner et al. | 701/13 |
| 6,577,864 B2 * | 6/2003 | Castiel et al. | 455/427 |
| 6,611,683 B1 * | 8/2003 | Castiel et al. | 455/427 |
| 6,633,551 B1 * | 10/2003 | Kent et al. | 370/316 |
| 6,667,713 B2 * | 12/2003 | Green et al. | 342/357.02 |
| 6,678,519 B2 * | 1/2004 | Castiel et al. | 455/427 |
| 6,701,126 B1 * | 3/2004 | Draim | 455/13.1 |
| 6,714,521 B2 * | 3/2004 | Draim | 370/316 |
| 6,725,012 B1 * | 4/2004 | Janson et al. | 455/12.1 |
| 6,726,152 B2 * | 4/2004 | Higgins | 244/158.4 |
| 6,766,987 B2 * | 7/2004 | Taormina et al. | 244/158.4 |
| 6,795,687 B1 * | 9/2004 | Castiel et al. | 455/13.1 |
| 6,847,867 B1 * | 1/2005 | Elliott | 701/13 |
| 6,866,231 B2 * | 3/2005 | Higgins | 244/158.4 |
| 6,868,316 B1 * | 3/2005 | Stevens | 701/13 |
| 6,892,986 B2 * | 5/2005 | Bingaman et al. | 244/158.4 |
| 6,945,500 B2 * | 9/2005 | Wingo | 244/159.4 |
| 6,950,060 B1 * | 9/2005 | Klein | 342/358 |
| 6,954,613 B1 * | 10/2005 | Castiel et al. | 455/12.1 |
| 6,985,454 B1 * | 1/2006 | Wiedeman et al. | 370/316 |
| 7,184,761 B1 * | 2/2007 | Wang | 455/427 |
| 7,198,230 B2 * | 4/2007 | Yung et al. | 244/158.4 |
| 7,255,308 B1 * | 8/2007 | Murphy | 244/158.4 |
| 7,258,305 B1 * | 8/2007 | Murphy | 244/158.4 |
| 7,270,299 B1 * | 9/2007 | Murphy | 244/158.4 |
| 7,277,797 B1 * | 10/2007 | Kunitsyn et al. | 702/15 |
| 7,348,917 B2 * | 3/2008 | Stankwitz et al. | 342/25 R |
| 7,369,809 B1 * | 5/2008 | Wang | 455/12.1 |
| 7,370,566 B2 * | 5/2008 | Furman | 89/1.11 |
| 7,480,506 B2 * | 1/2009 | Wang | 455/427 |
| 7,486,224 B2 * | 2/2009 | Ghaleb et al. | 342/81 |
| 7,789,339 B2 * | 9/2010 | Sommer | 244/3 |
| 2001/0012759 A1 * | 8/2001 | Castiel et al. | 455/12.1 |
| 2001/0045494 A1 * | 11/2001 | Higgins | 244/158 R |
| 2001/0051521 A1 * | 12/2001 | Castiel et al. | 455/429 |
| 2002/0041328 A1 * | 4/2002 | LeCompte et al. | 348/144 |
| 2002/0050953 A1 * | 5/2002 | Fang | 343/703 |
| 2002/0132577 A1 * | 9/2002 | Draim | 455/12.1 |
| 2002/0136191 A1 * | 9/2002 | Draim et al. | 370/344 |
| 2002/0160710 A1 * | 10/2002 | Castiel et al. | 455/12.1 |
| 2003/0006930 A1 * | 1/2003 | Lodwig et al. | 342/120 |
| 2003/0025041 A1 * | 2/2003 | Higgins | 244/158 R |
| 2003/0034422 A1 * | 2/2003 | Higgins | 244/158 R |
| 2003/0036826 A1 * | 2/2003 | Turner et al. | 701/3 |
| 2003/0040852 A1 * | 2/2003 | Green et al. | 701/13 |
| 2003/0155468 A1 * | 8/2003 | Goodzeit | 244/158 R |
| 2003/0225492 A1 * | 12/2003 | Cope et al. | 701/35 |
| 2004/0021770 A1 * | 2/2004 | Krill | 348/117 |
| 2004/0065781 A1 * | 4/2004 | Bingaman et al. | 244/172 |
| 2004/0113835 A1 * | 6/2004 | Jones et al. | 342/160 |
| 2004/0149485 A1 * | 8/2004 | Edwards | 174/117 R |
| 2004/0151504 A1 * | 8/2004 | Triebes et al. | 398/131 |
| 2005/0040282 A1 * | 2/2005 | Wingo | 244/10 |
| 2006/0060717 A1 * | 3/2006 | Castiel et al. | 244/158.4 |
| 2006/0169846 A1 * | 8/2006 | Rabinowitz | 244/172.8 |
| 2006/0170585 A1 * | 8/2006 | Stankwitz et al. | 342/25 A |
| 2006/0276128 A1 * | 12/2006 | Castiel et al. | 455/12.1 |
| 2007/0072603 A1 * | 3/2007 | Wang | 455/427 |
| 2007/0221787 A1 * | 9/2007 | McKinnon et al. | 244/171.8 |
| 2007/0284482 A1 * | 12/2007 | Furman | 244/158.4 |
| 2007/0285304 A1 * | 12/2007 | Cooper | 342/62 |
| 2008/0027649 A1 * | 1/2008 | Oertel et al. | 702/5 |
| 2008/0039904 A1 * | 2/2008 | Bulkes et al. | 607/62 |
| 2008/0042897 A1 * | 2/2008 | Ghaleb et al. | 342/354 |
| 2008/0191949 A1 * | 8/2008 | Rao et al. | 343/703 |
| 2009/0140906 A1 * | 6/2009 | Rao et al. | 342/1 |

* cited by examiner

SYSTEM AND METHOD FOR OBSERVING A SATELLITE USING A SATELLITE IN RETROGRADE ORBIT

BACKGROUND OF THE INVENTION

1. Field of the Invention

The present invention relates to satellites. More specifically, the present invention relates to systems and methods for observing and inspecting satellites.

2. Description of the Related Art

A considerable investment has been made to place satellites in geosynchronous orbit (GEO) to perform a variety of functions. Geosynchronous satellites are satellites with an orbital track on the Earth that repeats regularly over points on the Earth over time. Geosynchronous satellites located at the equator appear stationary over the Earth and hence are referred to as 'Geostationary'.

Geosynchronous satellites periodically encounter problems and anomalies and are also subject to attack. Hence, there is a need to inspect geosynchronous satellites and other objects in space to determine the status thereof. This may include detection and resolution of anomalies on spacecraft. Detecting new objects, verifying the position and velocity of existing objects, and collecting imagery of objects serve a number of military, civil, and commercial needs. For example, this information could be useful to avoid collisions in space and understand the operating status of satellites.

Currently, this information is collected from the ground and from space based platforms in low earth orbit (LEO). Unfortunately, collection of information from ground-based assets and LEO is difficult for satellites at long range. The vast majority of satellites in geosynchronous (24-hour) orbits are at approximately 35,800 km altitude. Ground-based electro-optic assets can detect some objects at this altitude, but telescope sizes limit the ability to collect high-resolution imagery. In principle, ground-based radar systems can collect high-resolution imagery independent of the range to the target using inverse synthetic aperture techniques. However, the extremely small ground velocity of most satellites at GEO makes this difficult or impossible in practice.

Some have considered placing satellites in GEO-like orbits with a number of sensor types to collect data and image satellites. See, for example, U.S. Pat. No. 4,387,391 entitled SATELLITE INSPECTION SYSTEM USING HOVERING-TYPE INTERCEPTORS, issued Jun. 7, 1983 to K. J. Hecker, the teachings of which are hereby incorporated herein by reference. These approaches typically allow detailed monitoring of only one satellite over a long time period. That is, the nearly coincident orbits of the observer and target satellites result in time periods on the order of hours to collect synthetic aperture imagery and do not enable collection of information large numbers of satellites.

It is also difficult to maintain optimal range separation for imaging while controlling relative velocity due to orbital dynamics. For example, an observer that wishes to stay within ~100 km of a target satellite will have a relative velocity of less than 10 meters/second and will drift through the entire GEO belt in approximately nine (9) months. Hence, it would take a long time to observe a large number of satellites.

There is an unfilled need to be able to monitor and image these satellites on a regular basis. That is, there is a need in the art for an improved system or method for frequently revisiting orbital assets to detect and characterize the status thereof.

SUMMARY OF THE INVENTION

The need in the art is addressed by the system and method of the present invention. Generally, the inventive system includes a satellite and an arrangement for placing the satellite in a retrograde orbit, i.e. inclined at approximately 180° to the equator. Multiple satellites may be used and the orbits thereof may be circular or elliptical.

The invention is well-suited for an illustrative satellite inspection application. In this embodiment, the system includes one or more satellites; means disposed on each satellite for receiving electromagnetic energy from objects (e.g. satellites) within a field-of-view thereof; and an arrangement for placing the inspection satellites in a retrograde orbit. The satellites may be equally spaced in a single orbit or disposed in equally spaced orbits. The satellites may include a variety of instruments including radar, infrared, visible, etc. In a radar implementation, the satellite may include a receive-only capability as part of a bistatic radar or (with a transmitter) monostatic radar system. In the bistatic case, the signal may be transmitted from a ground-based or space based platform.

DESCRIPTION OF THE INVENTION

Figure 1A:
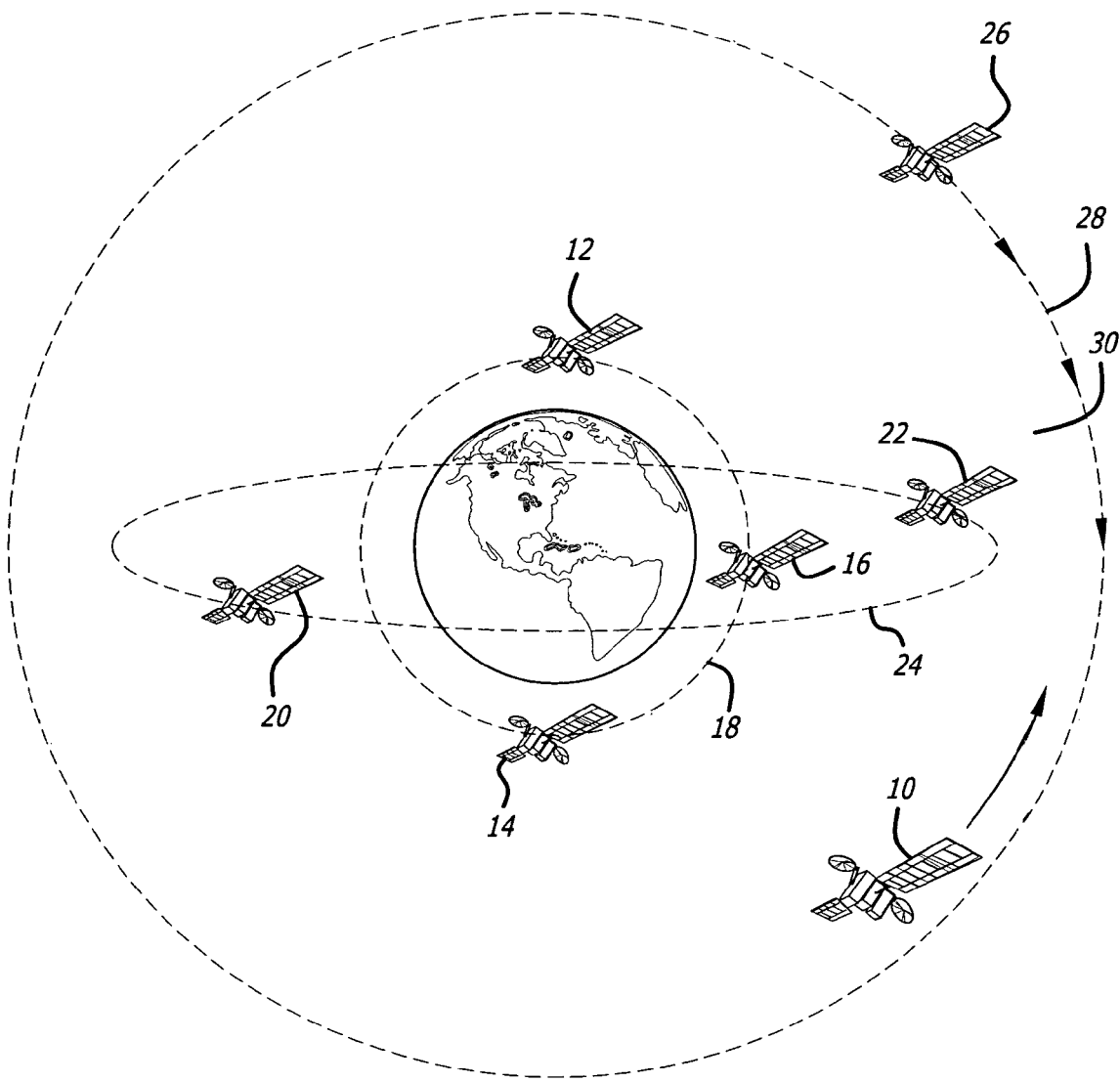
FIG. 1a is a simplified orbital diagram of a satellite deployed in accordance with an illustrative embodiment of the present teachings.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Systems and methods for placing satellites in orbit are well-known in the art. See, for example, U.S. Pat. No. 6,182,928 entitled METHOD FOR PLACING AN ARTIFICIAL SATELLITE ON A GEOSTATIONARY ORBIT, issued Feb. 6, 2001 to A. Wagner; U.S. Pat. No. 6,128,575 entitled METHODS FOR ACCURATELY INSERTING SATELLITE CONSTELLATIONS INTO COMMON ORBIT PLANES, issued Oct. 3, 2000 to Croom et al.; and U.S. Pat. No. 5,687,084 entitled SATELLITE ORBIT MAINTENANCE SYSTEM, issued Nov. 11, 1997 to J. R. Wertz, the teachings of all of which are hereby incorporated herein by reference.

The present invention employs one or more satellites in retrograde orbits to rapidly re-visit most or all satellites located at GEO. In the preferred embodiment, the satellites are inclined at approximately 180 degrees to the equator at an altitude of approximately 35,800 km (anti-GEO). Each satellite deployed in accordance with the present teachings revisits the entire GEO belt of satellites twice per day. Thus, spacing N satellites equally can provide 12/N hour revisit. In the illustrative embodiment, the relative velocity of the satellites to a GEO satellite under observation is approximately 6.1 km/sec. This facilitates synthetic aperture radar image collection inasmuch as the image collection period to collect monostatic or bi-static (illuminated from the ground) synthetic aperture radar (SAR) imagery is proportional to the relative velocity.

Further, a satellite deployed in accordance with the present teachings can be maneuvered to an arbitrary separation distance from a GEO satellite while maintaining the high relative velocity. The present invention can include other imaging sensors (e.g. electro-optical, infrared, or ladar. The present invention can be a receive-only node of a bi-static radar (detection/tracking and/or imaging). There are many transmitters on the Earth that operate at VHF to W band with sufficient power to illuminate a satellite at GEO. The present invention provides a receiver very close to the target whose relative velocity enables one or more complete images to be collected in seconds or minutes. Variants of the present invention can be introduced to guarantee desired ranges to target and/or to view the nadir and zenith sides of satellites on successive orbits. Another embodiment of the present invention employs a highly eccentric orbit.

The preferred implementation of the present invention employs N satellites (N is an integer of one or greater) equally phased in a circular orbit having an inclination of approximately 180° at an altitude of approximately 35300 km. The satellites carry radar transmit and receive systems capable of collecting synthetic aperture imagery and also of receiving reflected signals from ground based transmitters. The present invention is depicted in FIG. 1a.

FIG. 1a is a simplified orbital diagram of a satellite 10 deployed in accordance with an illustrative embodiment of the present teachings. FIG. 1a shows three satellites 12, 14 and 16 in a low earth orbit (LEO) 18, two satellites 20 and 22 in a middle earth orbit (MEO) 24, and one satellite 26 in a geosynchronous orbit 28. In accordance with the present teachings, at least one satellite 10 is deployed in a retrograde orbit (i.e. at 180 degrees angle of inclination relative to a reference (e.g. equatorial) plane) 30.

Figure 1B:
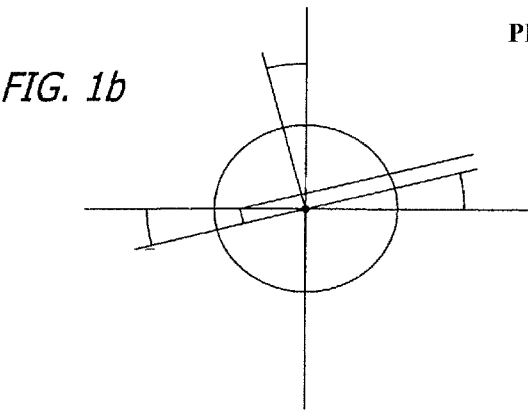
FIG. 1b is a diagram that illustrates orbital geometry in accordance with conventional teachings.

FIG. 1b is a diagram that illustrates orbital geometry for describing the orbit of an orbiting object in accordance with conventional teachings. Note that with geostationary satellites disposed about the equatorial plane, a 180° angle of inclination is effective to establish a retrograde orbit for the satellite 10 in accordance with the present teachings. To achieve retrograde orbit 30, the satellite 10 must be boosted to an altitude of approximately 35,300 km and a tangential velocity of approximately 3.05 km/sec, such that the circular orbit is opposite the direction of the Earth's rotation. Flying in this fashion, the average velocity of the inspection satellite of the present invention relative to resident objects in GEO orbits should be slightly more than 6 km/sec. and enables the satellite to pass within 500 km of each object, on average. In the illustrative embodiment, an X-band radar is included in the satellite 10 to collect imagery with 6 inch impulse response in less than 30 seconds.

The satellite 10 is optimally located to survey the orbits at and near GEO satellites for unknown objects. This should allow for the use of a very inexpensive sensor (optical or RF) to "sweep" the GEO belt every 12 hours.

Figure 1C:
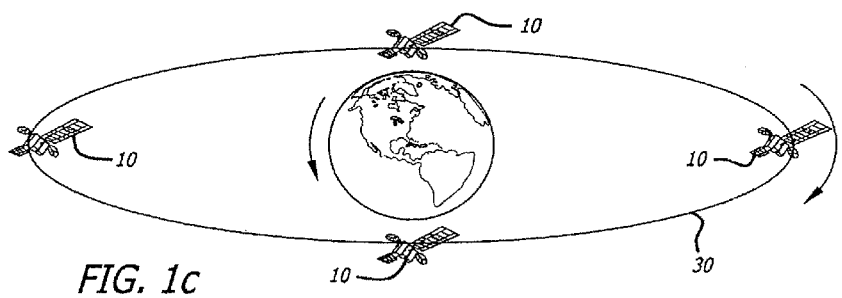
FIG. 1c is a simplified orbital diagram showing a constellation of multiple satellites deployed in accordance with the present teachings.

FIG. 1c is a simplified orbital diagram showing a constellation of multiple satellites deployed in accordance with the present teachings. While four (4) satellites are shown, the invention is not limited thereto. In any case, note that the orbit of each satellite 10 is retrograde relative to the rotation of the earth. In this implementation, each satellite 10 should be able to visit every assigned GEO orbital slot at 12/N hours, where N is the number of equally and uniformly spaced satellites, and should be able to scan the three dimension volume of objects whose orbits is at GEO or have periods close to 24 hours and up to 6 degrees of inclination. An alternative embodiment employs N satellites equally spaced in a highly elliptical orbit (HEO) as shown in FIG. 2a.

Figure 2A:
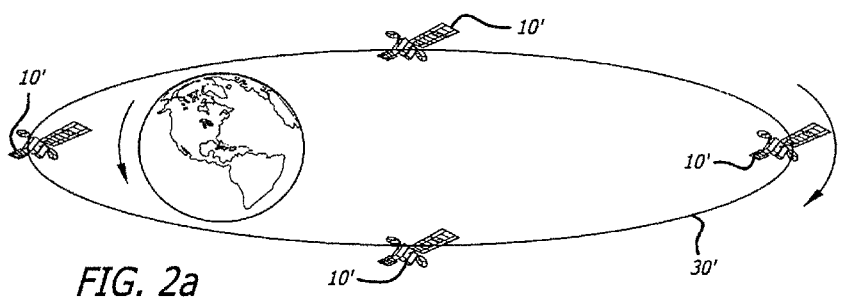
FIG. 2a is a simplified orbital diagram showing a constellation of multiple satellites deployed in a highly elliptical orbit in accordance with an alternative embodiment of the present teachings.

FIG. 2a is a simplified orbital diagram showing a constellation of multiple satellites 10' deployed in a highly elliptical orbit 30' in accordance with an alternative embodiment of the present teachings. To achieve this orbit 30', the satellites must be boosted to an apogee at the same height as the circular orbits shown in FIG. 1c as the circular or nearly circular orbits. The exact apogee and perigee of the HEO orbit can be tailored to optimize the frequency of revisit, closest range, and relative velocity between objects and the present invention. See FIG. 2b.

Figure 2B:
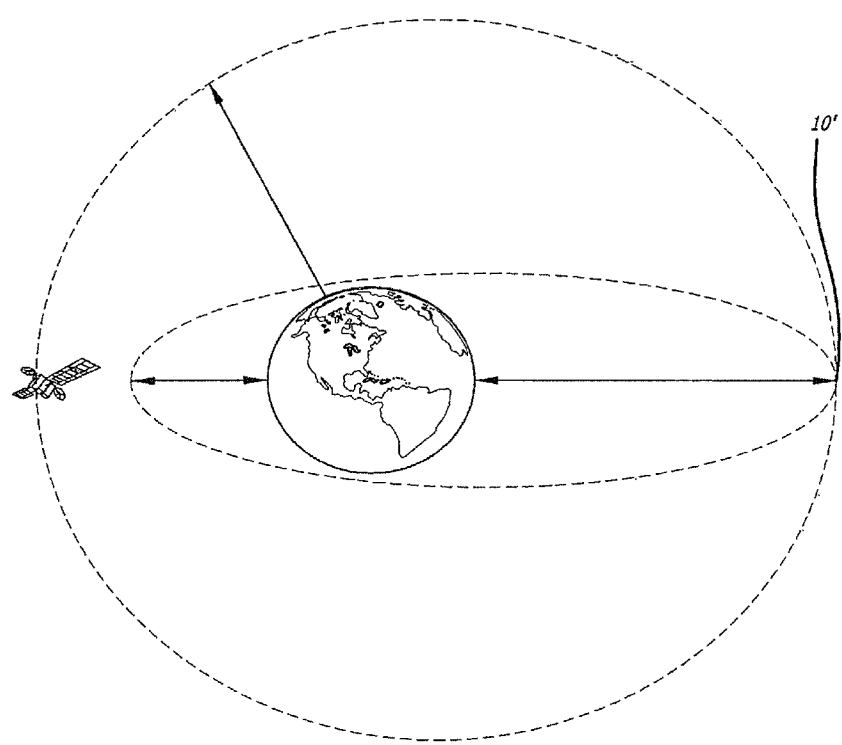
FIG. 2b is a diagram that illustrates circular and elliptical orbits in accordance with conventional teachings.

FIG. 2b is a diagram that illustrates circular and elliptical orbits in accordance with conventional teachings. Employing an apogee of 36000 km and a perigee of 1000 km provides an orbit roughly every 11 hours. Each satellite 10' in this orbit will spend the majority of each orbit near apogee at relatively close range to GEO objects and only a brief period near perigee. The HEO orbit can be achieved with much less energy/fuel expended by the launch system compared with the preferred implementation of FIG. 1a. It achieves somewhat less frequent revisit of GEO objects and has a wider range of relative velocities. Placing apogee above 35,800 km enables a single satellite to collect data from above and below a resident space object in a single orbit. The HEO orbits can have inclinations of approximately 180°, 126°, 63.4° or 0°.

Figures 3A, 3B:
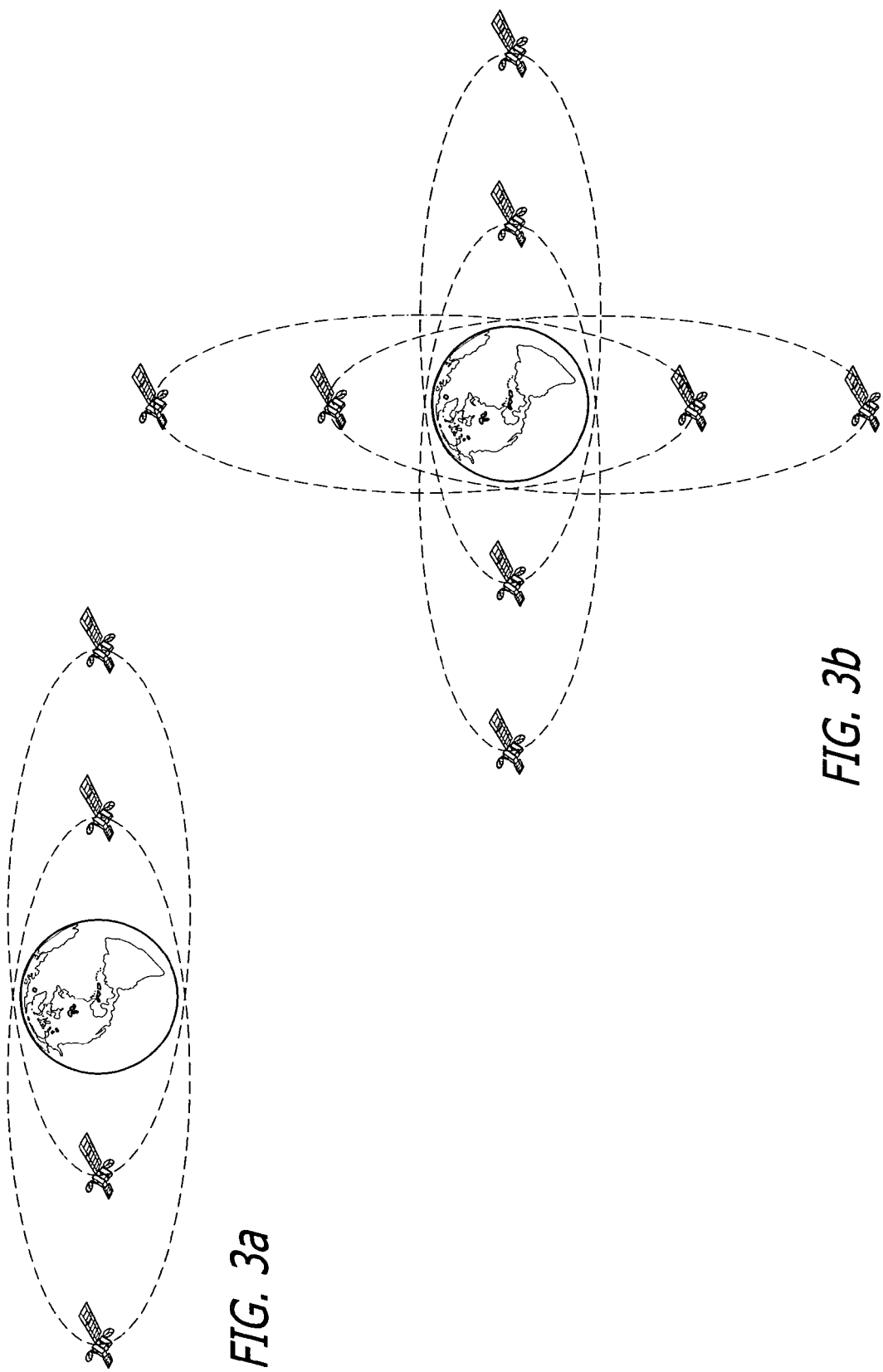
FIG. 3a is a simplified orbital diagram of four satellites deployed in accordance with an illustrative embodiment of the present teachings.
FIG. 3b is a simplified orbital diagram of eight satellites deployed in accordance with an illustrative embodiment of the present teachings.

A variant of the HEO orbital approach employs N satellites in one to M planes. This is illustrated in FIG. 3a in which four satellites are shown in two high earth orbit planes and in FIG. 3b in which eight satellites are shown in four high earth orbit planes. The orbits are shown as being the same size. However, orbits at different altitudes may be employed without departing from the scope of the present teachings. Many additional embodiments are possible including employing orbits at altitudes closer to 35,800 km that will pass closer to GEO satellites. Such orbits would be most useful to enable the collection of high-resolution electro-optic or other passively collected imagery. A wide variety of sensors can be employed to image resident objects and detect new objects.

In another embodiment one or more satellites deployed in accordance with the present teachings can provide a stealth capability by employing receive-only sensors that collect reflections of ground-based transmissions from resident and new space objects in accordance with a bistatic mode of operation. Optionally, a system in accordance with the present teachings could collect the original ground-based transmission. Further, the system could transmit its collected data to a ground-based receiver in the same frequency band as the ground-based transmitter; masking the presence of the signal. This latter technique is especially effective if the ground transmits a wide-band RF signal and the satellite system employs spread-spectrum techniques to match its transmission to the width of the ground signal.

The orbits can be eccentric and/or inclined up to 9° from the equator to enable viewing angles above and below GEO satellites and to achieve close range passes of GEO satellites with small inclinations. Using monostatic and/or bistatic imaging and detection techniques the present invention can efficiently collect high-resolution imagery and detect small objects from altitudes between approximately 34,000 and 37,500 kilometers.

The precise orbital characteristics of these circular and slightly elliptical orbits can be tailored to optimize relative velocity, range, and/or the bistatic bisector geometry between satellites of the present invention and satellites to be observed.

Hence, a nonexhaustive list of features of the invention include:

1. Extremely frequent (12/N hrs) revisit and survey of the entire GEO belt using N satellites (N≧1).
2. Extremely frequent image and sensing updates of most or all objects in the GEO belt.
3. Rapid collection of high-resolution monostatic SAR image collection using N satellites.
4. Rapid of high resolution, stealthy, bi-static image collection using N satellites.

Thus, the present invention has been described herein with reference to a particular embodiment for a particular application. Those having ordinary skill in the art and access to the present teachings will recognize additional modifications applications and embodiments within the scope thereof. For example, the present teachings may be used for collision avoidance, solar guidance, data relay and other applications. In addition, the satellites may have other missions, e.g., scanning, weather, and communications as well.

It is therefore intended by the appended claims to cover any and all such applications, modifications and embodiments within the scope of the present invention.

Accordingly,

What is claimed is:

1. A satellite inspection system comprising:
at least one satellite configured to collect imagery of space-orbiting objects within a field-of-view thereof, the space-orbiting objects being in a geosynchronous orbit, and the at least one satellite being configured in a retrograde orbit at an altitude between approximately 34,000 and 37,500 kilometers such that the at least one satellite revisits the space-orbiting objects within 500 km of the space-orbiting objects in substantially 12 hours or less.

2. The invention of claim 1 wherein said retrograde orbit is circular.

3. The invention of claim 2 wherein said retrograde orbit is inclined at approximately 180° to the equator.

4. The invention of claim 3 wherein said retrograde orbit is at an altitude of approximately 35,800 kilometers.

5. The invention of claim 3 wherein said retrograde orbit is at an altitude of approximately 35,300 kilometers.

6. The invention of claim 1 wherein said retrograde orbit is eccentric.

7. The invention of claim 6 wherein said retrograde orbit is elliptical.

8. The invention of claim 1 wherein said retrograde orbit is inclined from the equator.

9. The invention of claim 8 wherein said retrograde orbit is inclined at approximately 126° or 180° from the equator.

10. The invention of claim 9, wherein said retrograde orbit has an apogee of 36,000 Km and a perigee of 1000 Km.

11. The invention of claim 1 wherein the at least one satellite comprises N satellites disposed in said retrograde orbit, where N is an integer greater than or equal to one.

12. The invention of claim 11 wherein said N satellites are equally spaced.

13. The invention of claim 1 wherein the at least one satellite includes a radar.

14. The invention of claim 13 wherein said radar is an X-band radar.

15. The invention of claim 13 wherein said radar is a bistatic radar.

16. The invention of claim 15, wherein said bistatic radar comprises a transmitter on the ground.

17. The invention of claim 16, wherein said bistatic radar is adapted to form a synthetic aperture radar image of the space-orbiting objects.

18. The invention of claim 15, wherein said bistatic radar is a bistatic synthetic aperture radar.

19. The invention of claim 18, wherein said bistatic synthetic aperture radar comprises a transmitter on the ground.

20. The invention of claim 13, wherein said radar is a synthetic aperture radar.

21. The invention of claim 1 wherein the at least one satellite includes a receiver adapted to detect visible and/or infrared energy.

22. The invention of claim 1 wherein the at least one satellite includes a lens.

23. The invention of claim 22 wherein said lens is disposed in a telescope.

24. The invention of claim 22 wherein said lens is disposed in a camera.

25. The invention of claim 1 wherein said space-orbiting objects comprise a second satellite.

26. The invention of claim 25 wherein said second satellite is disposed in a geostationary orbit.

27. The invention of claim 1, wherein the at least one satellite is adapted to collect a synthetic aperture radar image having a six inch resolution of at least one of the space-orbiting objects in the geosynchronous orbit in substantially minutes or less.

28. The invention of claim 27, wherein the at least one satellite is adapted to collect the synthetic aperture radar image at X-band or lower frequency.

29. An object observation and inspection method, the method comprising:
collecting imagery of space-orbiting objects using at least one satellite using at least one satellite, the space-orbiting objects being in a geosynchronous orbit; and
configuring the at least one satellite in a retrograde orbit at an altitude between approximately 34,000 and 37,500 kilometers such that the at least one satellite revisits the space-orbiting objects within 500 km of the space-orbiting objects in substantially 12 hours or less.

30. The method of claim 29, wherein the collecting imagery of space-orbiting objects comprises collecting imagery of at least one of the space-orbiting objects with six inch impulse response in less than 30 seconds.

31. The method of claim 30, wherein the collecting imagery of space-orbiting objects further comprises collecting imagery of the at least one of the space-orbiting objects at X-band or lower frequency.

32. The method of claim 29, wherein the collecting imagery of space-orbiting objects comprises collecting reflections of ground-based transmissions from at least one of the space-orbiting objects.

33. The method of claim 32, further comprising transmitting the collected imagery to a ground-based receiver in the same frequency band of the ground-based transmissions.

34. The method of claim 33, wherein the transmitting the collected imagery to a ground-based receiver employs spread-spectrum technique.

35. An object observation and inspection method, the method comprising:

configuring at least one satellite in a retrograde orbit to revisit space-orbiting objects in a geosynchronous orbit, in substantially 12 hours or less; and collecting imagery of at least one of the space-orbiting objects with six inch impulse response in minutes or less.

* * * * *